Jan. 3, 1933.  V. G. APPLE  1,893,261
MOTOR FOR DRIVING FLEXIBLE SHAFTS
Filed Sept. 19, 1929  4 Sheets-Sheet 1

INVENTOR

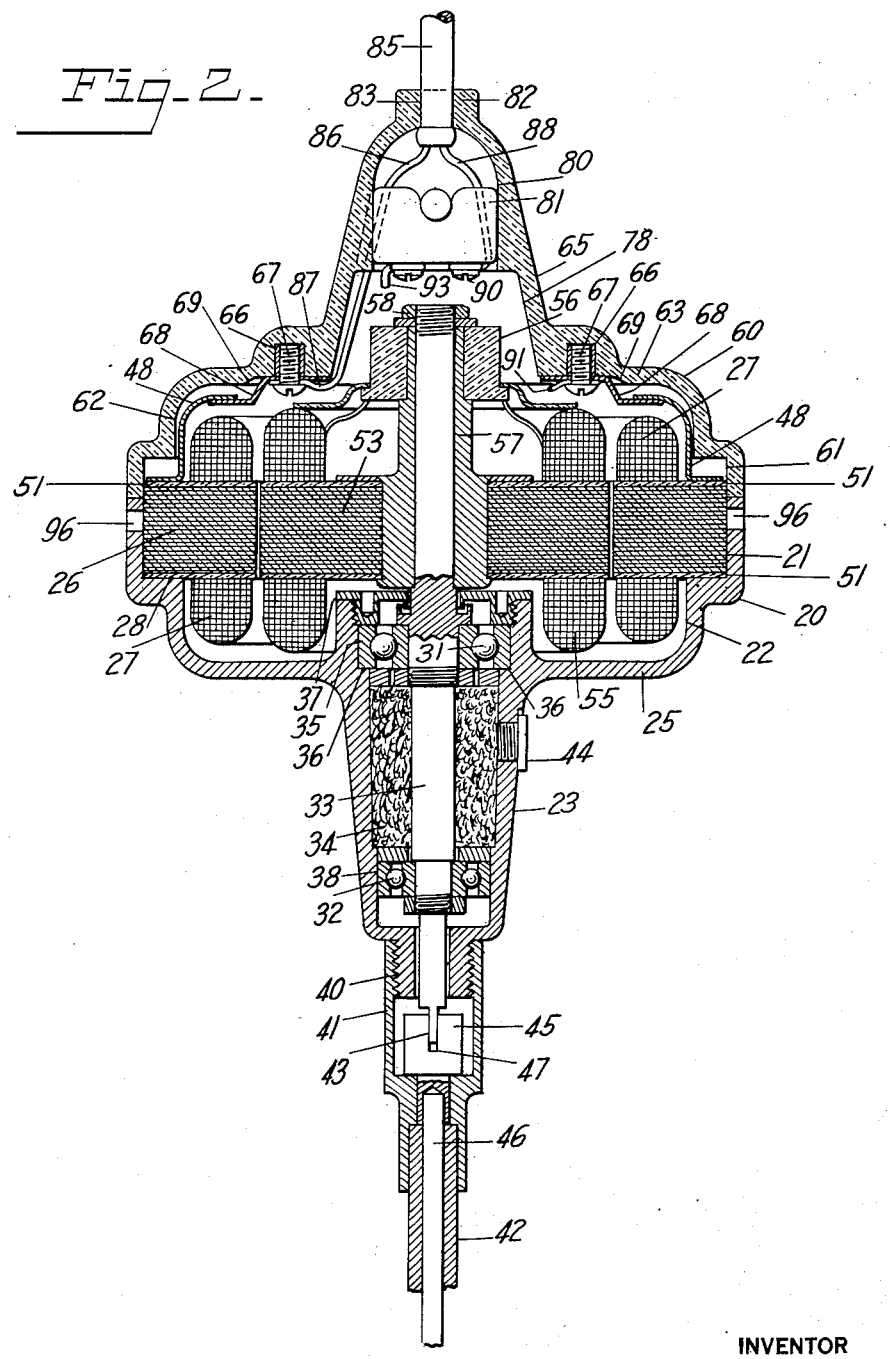

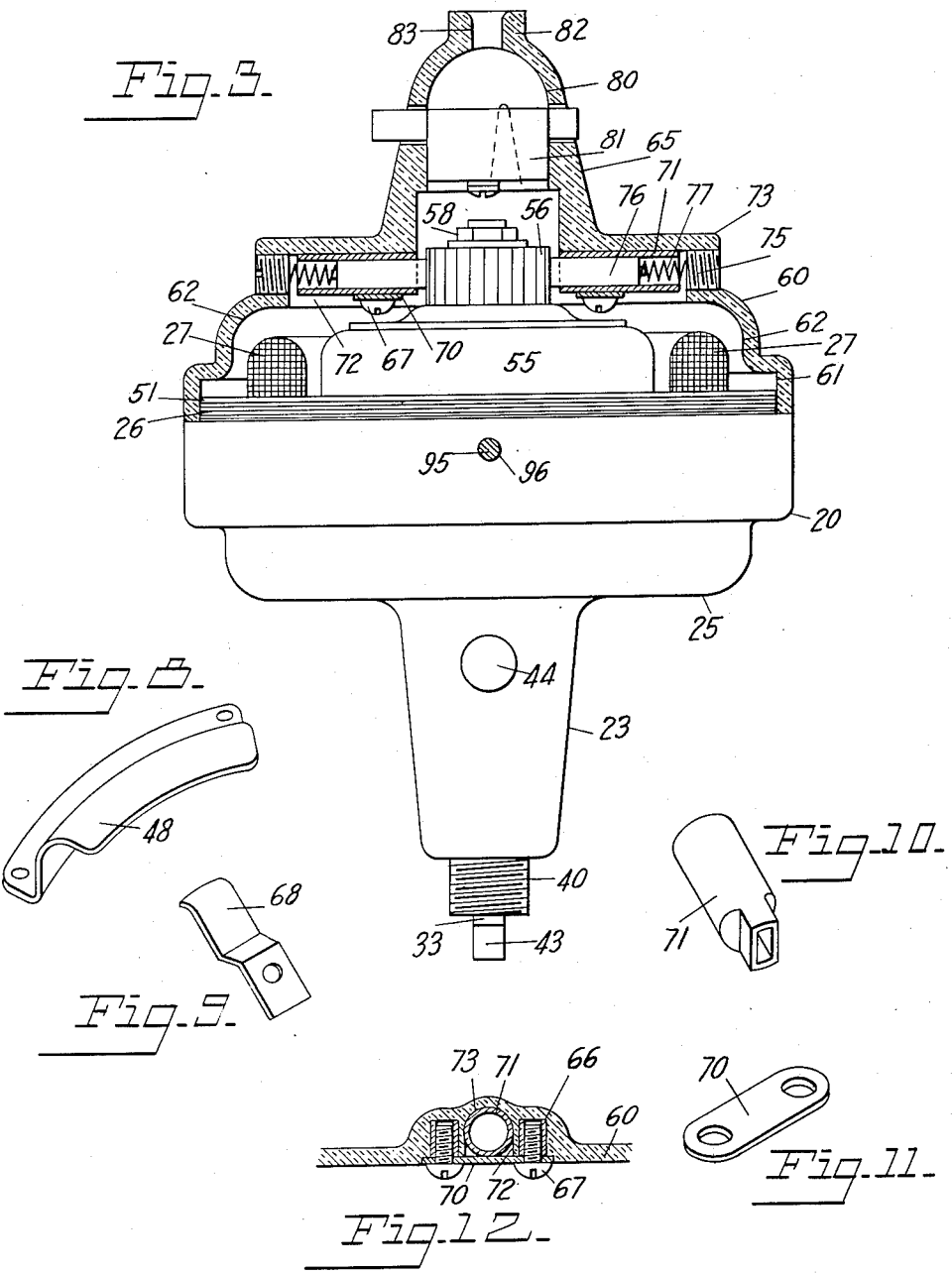

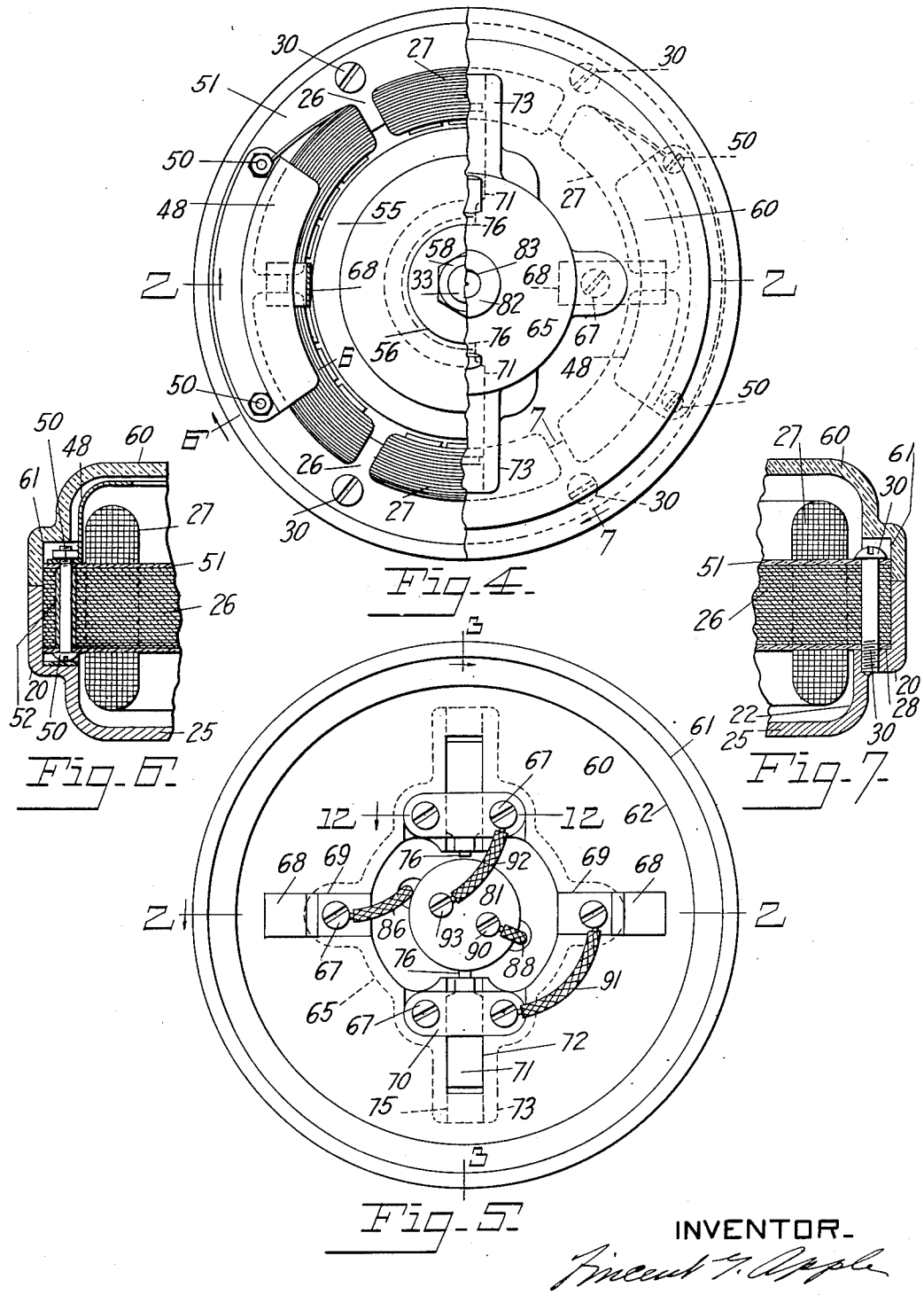

Patented Jan. 3, 1933

1,893,261

UNITED STATES PATENT OFFICE

VINCENT G. APPLE, OF DAYTON, OHIO; HERBERT F. APPLE, EDWARD M. APPLE, AND GOURLEY DARROCH, EXECUTORS OF SAID VINCENT G. APPLE, DECEASED

MOTOR FOR DRIVING FLEXIBLE SHAFTS

Application filed September 19, 1929. Serial No. 393,710.

This invention relates to electric motors and particularly to motors arranged for driving flexible shafts.

An object of the invention is to construct a motor particularly suited to this purpose by providing field and armature units of relatively large diameter and short lengths, whereby low revolution speed relative to power output is attained.

Another object is to provide a motor requiring little or no attention to keep it in operating condition.

Another object is to provide a motor of few parts which are quickly assembled or disassembled, as desired.

Other objects will become apparent as the invention is described in detail and reference is made to the drawings, wherein—

Fig. 2 is a longitudinal sectional view on the line 2—2 of Figs. 4 and 5.

Fig. 3 is a side elevation, the upper portion being a section on the line 3—3 of Fig. 5.

Fig. 4 is a top plan view with part of the top casing broken away.

Fig. 5 is a bottom plan view of the top casing showing the electrical connections.

Fig. 6 is a section on the line 6—6 of Fig. 4.

Fig. 7 is a section on the line 7—7 of Fig. 4.

Figs. 8 and 9 are detail perspective views of parts for attaching the top casing.

Figs. 10 and 11 are detail perspective views of the brush mechanism.

Fig. 12 is a section on the line 12—12 of Fig. 5.

Similar numerals refer to similar parts throughout the several views.

Figure 1:
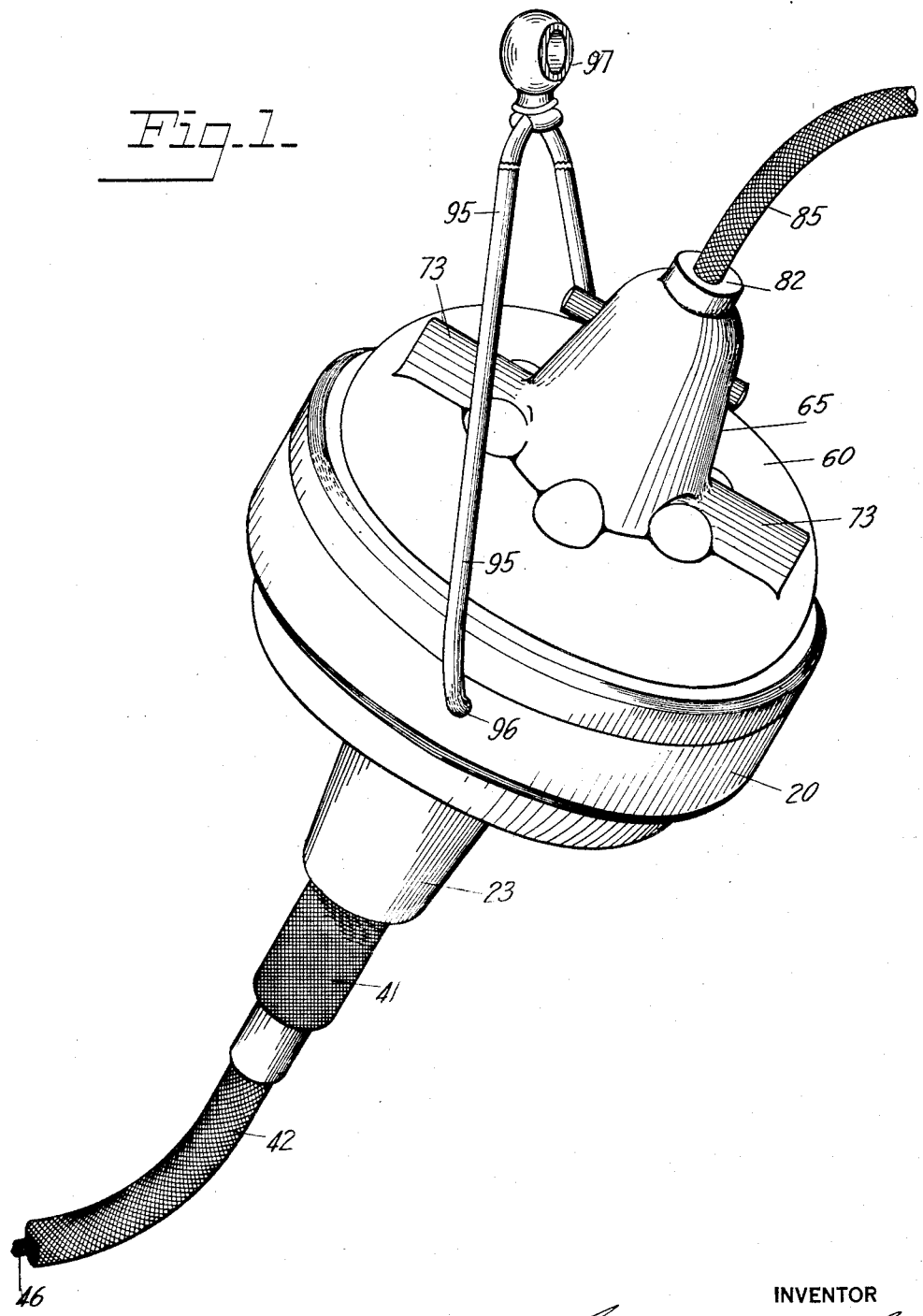
Fig. 1 is a perspective view of my invention.

The body 20 of the motor is in the form of a shallow cup having two diameters 21 and 22, and a long hub 23, concentric with the diameters, in the bottom 25 of the cup.

A field core 26 wound with coils 27 fits into the diameter 21 and is held in place against shoulder 28 by screws 30 (see Fig. 7), the diameter 22 being of proper size to clear the coils.

Hub 23 houses the ball bearings 31 and 32 spaced apart on the armature shaft 33. Bearing 31 fits the diameter 35 of the hub and is clamped against shoulder 36 by the closing nut 37 to prevent axial movement of the bearing in the hub, while bearing 32 fits the diameter 38 but is not restricted by the hub against axial movement. Packing 34 of felt or similar absorptive material fills the space between the bearings and by removal of the shouldered screw 44 the packing may be saturated with oil for lubricating the bearings. The lower end of the hub is threaded as at 40 for the fitting 41 on the end of the flexible shaft casing 42 while the end of the armature shaft 33 is flatted as at 43 to adapt it to drive the fitting 45 of the flexible shaft 46 by extending into the slot 47 of the fitting.

Electrically joined to the ends of the field coils 27 are two arcuate field terminals 48. They are rigidly secured to the core 26 by screws 50, although they are electrically insulated from the core because the outer laminæ 51 of the core are of insulation and because bushings 52 surround the screws where they pass through the core (see Fig. 6). The terminals 48 serve not only as attaching means to hold the end enclosing head in place, but also as terminal members to connect the field winding in the circuit.

The armature comprises the core 53, the coils 55, the commutator 56 and the sleeve 57. The core and commutator are press fitted to the sleeve and the entire armature assembly is held on shaft 33 by nut 58.

The end enclosing head 60 is made of molded insulation and all contact members necessary to join the armature and the field unit to the external circuit are carried by this head. It is of cup shape similar to the body 20, having a diameter 61 into which the core 26 fits freely, a smaller diameter 62 to clear the coils 27, a bottom 63, and a hub part 65 concentrically held in said bottom.

Six tapped metal hubs 66 are imbedded in the end enclosing head 60 and into the hubs the screws 67, which complete the various connections, extend. Two screws 67 hold the two field coil contacts 68 secured in the radially extending depressions 69 in the inside surface of the head while the other four screws 67 tighten the two clamping plates 70 which secure the tubular metal brush holders 71 in the radially extending channels 72 provided for them in the bosses 73 of the head. Screw plugs 75 close the outer ends of bosses 73 and the brushes 76 and brush springs 77 may be entered and removed when these plugs are not in place.

The hub part 65 has an internal diameter 78 near the bottom sufficient to admit the commutator 56 and a somewhat smaller diameter 80 to admit a standard push button switch 81, although of course the switch may be omitted when other means to start and stop the motor are provided. The small hub 82 has an opening 83 to admit the lamp cord 85.

In the embodiment shown the field and armature windings are connected in series and this is accomplished by taking one side 86 of the lamp cord to one of the clips 68 as at 87, and the other side 88 to a switch terminal 90. It is then only necessary to connect the other clip 68 to a clamping plate 70 by a short metal connecter 91 and to connect the other clamping plate 70 by a short heavy wire 92 to the other switch terminal as at 93, (see Figs. 2 and 5).

A bail 95 snaps into two small holes 96 in the side of body 20, and has a swivelling eye 97 at its upper end, whereby the motor may be supported on any convenient hook and may turn bodily about its axis or swing about the holes 96 as the tools which are driven by the flexible shaft 46 are being used.

From a consideration of the description and drawings it will be seen that the end enclosing head 60 is a separate unit and that it may be assembled with the motor and removed therefrom by simply turning it about the motor axis for approximately an eighth of a revolution, or until the tips of the field coil contacts 68 emerge from under the arcuate field terminals 48, whereupon the head 60 may be removed and replaced without loosening any screws or other fastening means either electrical or mechanical.

The structure described also provides an adjustable brush position since the brushes may be shifted considerably about the axis before the tips of the field coil contacts 68 emerge from under the arcuate field terminals 48, and this feature may be employed to vary the motor speed, if desired.

The arrangement of the several elements of the motor provides distinct lubrication advantages, since the commutator, the brushes, the field coil contacts, and the windings, to all of which oil is detrimental, are above the chamber which carries the oil absorptive packing 34, while the flexible shaft 46 and its casing 42 are so located below the oil supply as to receive abundant lubrication by gravity.

Having described my invention, I claim—

1. In a dynamo electric machine, a field magnet, a winding on said magnet, field terminals carried by said magnet, the ends of said winding being connected to said terminals, an end enclosing head for the end of said field magnet and terminals, field coil contacts carried within said head, and line wires extending through said head and being electrically connected to said contacts, the ends of said contacts extending under the edges of said terminals and constituting the sole means for holding said head on said field magnet and for making electrical connection between said winding and said line wires.

2. The structure defined in claim 1 wherein movement of the head relative to the magnet withdraws the ends of said contacts from under the edges of the terminals whereby the electrical connection to the winding is broken and the head is mechanically disconnected from the field magnet.

3. The structure defined in claim 1 wherein rotation of the head relative to the magnet withdraws the ends of said contacts from under the edges of the terminals whereby the electrical connection to the winding is broken and the head is mechanically disconnected from the field magnet.

4. In a dynamo electric machine, a field magnet, a field winding on said magnet, arcuate field terminals carried by said magnet, the ends of said field winding being connected to said terminals, an end enclosing head for the end of said field magnet and terminals, field coil contacts and brush holders carried on the inside of said head, and line wires extending through said head and having electrical connection to said field coil contacts and said brush holders, the ends of said contacts extending under the edges of said arcuate terminals and constituting the sole means for holding said head on said field magnet, said head being rotatable about the axis of said dynamo electric machine to shift the said ends under the said edges to alter the relative position of said brush holders and said field winding.

5. The structure defined in claim 4 in which sufficient rotation of the head relative to the field magnet moves the said ends entirely from under the said edges whereby the field winding is disconnected from the line and the head may be removed from the field magnet.

6. An end enclosing head for a dynamo electric machine comprising a cup shaped member of insulation having a plurality of radially extending grooves in the inside surface of the bottom of the cup, brush tubes in some of said grooves and field coil contacts in the other of said grooves, tapped openings in the side of the cup in line with said brush tubes, threaded plugs in said tapped openings, and conductive members electrically connecting one of said brush holders and one of said field coil contacts, the other said field coil contact being connected to one side of the line.

7. The structure defined in claim 6 in which there is a central hollow hub extending from the middle of the bottom of said cup shaped member, an electric switch in said hollow hub, and conductive members connecting the switch to the brush holders and the field coil contacts.

In testimony whereof I affix my signature.

VINCENT G. APPLE.